Figure 1:
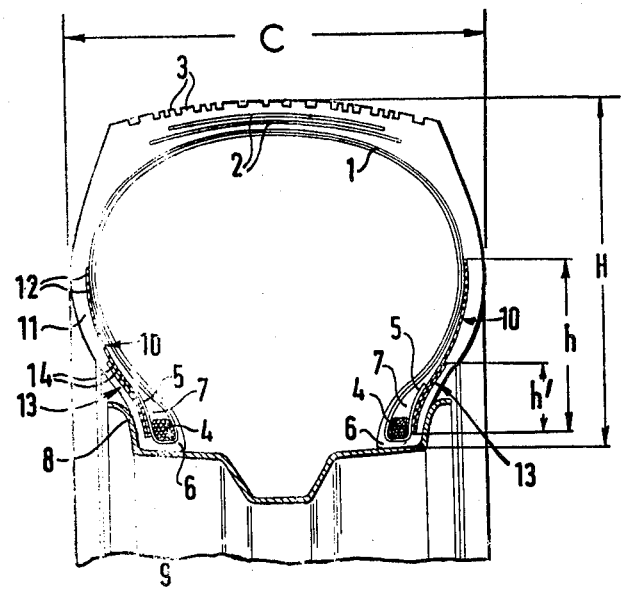

United States Patent [19]

Mezzanotte

[11] 4,214,620
[45] Jul. 29, 1980

[54] RADIAL TIRES HAVING A SIDEWALL STIFFENING CIRCUMFERENTIAL STRUCTURE

[75] Inventor: Mario Mezzanotte, Milan, Italy

[73] Assignee: Industrie Pirelli, S.p.A., Milan, Italy

[21] Appl. No.: 862,973

[22] Filed: Dec. 21, 1977

Related U.S. Application Data

[63] Continuation of Ser. No. 476,865, Jun. 6, 1974, abandoned.

[30] Foreign Application Priority Data

Jun. 12, 1973 [IT] Italy ............................ 25181 A/73

[51] Int. Cl.² .................. B60C 9/08; B60C 15/00
[52] U.S. Cl. ..................... 152/354 R; 152/362 R
[58] Field of Search .......... 152/354 R, 362 R, 362 CS

[56] References Cited

U.S. PATENT DOCUMENTS

| | | | |
|---|---|---|---|
| 3,040,797 | 6/1962 | Saint Paul | 152/362 R |
| 3,557,860 | 1/1971 | Maiocchi | 152/362 R |
| 3,638,705 | 2/1972 | Devienne | 152/362 R |
| 3,703,203 | 11/1972 | Simpson | 152/354 |
| 3,736,973 | 6/1973 | Mezzanotte et al. | 152/362 R |
| 3,841,377 | 10/1974 | Montagne | 152/362 CS |
| 3,853,163 | 12/1974 | Mezzanotte et al. | 152/362 R |

*Primary Examiner*—F. J. Bartuska
*Attorney, Agent, or Firm*—Stevens, Davis, Miller & Mosher

[57] ABSTRACT

A pneumatic tire is disclosed having a carcass with cords lying in radial or substantially radial planes, a strip of metal cords in the bead zone and the lower part of the sidewall extending radially from the core zone to from 25 to 45% of the tire section height with the cords inclined at an angle of 5° to 15° with respect to the circumferential lines of the tire and an axially outer situated second strip of cords of tension and compression resistant material, the cords of the second strip being inclined in an opposite sense to the cords of the first strip angled at 45° to 90° with respect to the circumferential lines of the tire. The tire structure permits the elimination of sidewall deformations when the tire runs at high speed along a curved trajectory, making for good riding comfort.

4 Claims, 3 Drawing Figures

RADIAL TIRES HAVING A SIDEWALL STIFFENING CIRCUMFERENTIAL STRUCTURE

This is a continuation of application Ser. No. 476,865 filed June 6, 1974, now abandoned.

In application Ser. No. 364,335, now U.S. Pat. No. 3,853,163, filed May 29, 1973, there is described a pneumatic tire for vehicle wheels comprising a carcass constituted by cords lying in radial planes or forming small angles with said planes, wherein the cords extend from one bead to the other and turn up about the cores contained in said beads, from the inner side towards the outer side. Each bead comprises a hard rubber filling situated on the bead core, and the bead zone and the lower zone of the sidewall comprise a strip of metal cords, arranged in an axially outer position with respect to the carcass and to the turn-ups of the latter.

The tire is characterized in that the metal cord strip extends radially from the core zone to a height ranging between 25% and 45% of the section height of the tire, and the strip, in the lower zone of the sidewall, lies substantially on the trace of the flexional neutral axis. The metal cords of the strip are inclined at an angle between 5° and 15° with respect to the circumferential lines of the tire.

The tire described in that application has the disadvantage of forming sidewall deformations when its tread is subjected to strong stresses, perpendicular to the mid-circumferential plane of the tire, which happens when the tire runs at high speed along a curved trajectory.

The present invention aims to provide a pneumatic tire for vehicle wheels which permits the elimination of the above mentioned disadvantage, affording at the same time a tire with high travelling comfort.

The tire according to the present invention, comprises a carcass constituted by cords lying in radial planes or forming small angles with said planes, said cords extending from one bead to the other and turning up about the cores contained in said beads from the inner side to the outer side, each bead comprising a filling of hard rubber positioned on the core, the bead zone and the lower zone of the sidewall comprising a first strip of metal cords, arranged in an axially outer position with respect to the carcass and to the turn-ups of the latter and extending radially from the core zone to a height ranging between 25% and 45% of the section height of the tire, said strip, in the lower zone of the sidewall, lying substantially on the trace of the flexional neutral axis and the metal cords of said strip being inclined at an angle ranging between 5° and 15° with respect to the circumferential lines of the tire, and a second strip of cords of a tension and compression resistant material, which is situated in an axially outer position with respect to said first strip, the cords of said second strip being inclined, in an opposite sense with respect to those of the first strip, at an angle between 45° and 90° with respect to the circumferential lines of the tire.

Figure 2:
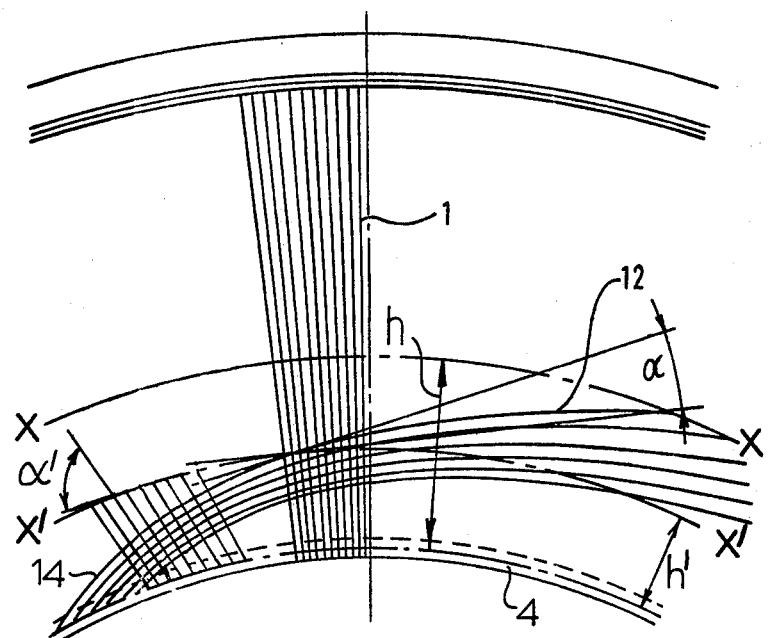
Figure 3:
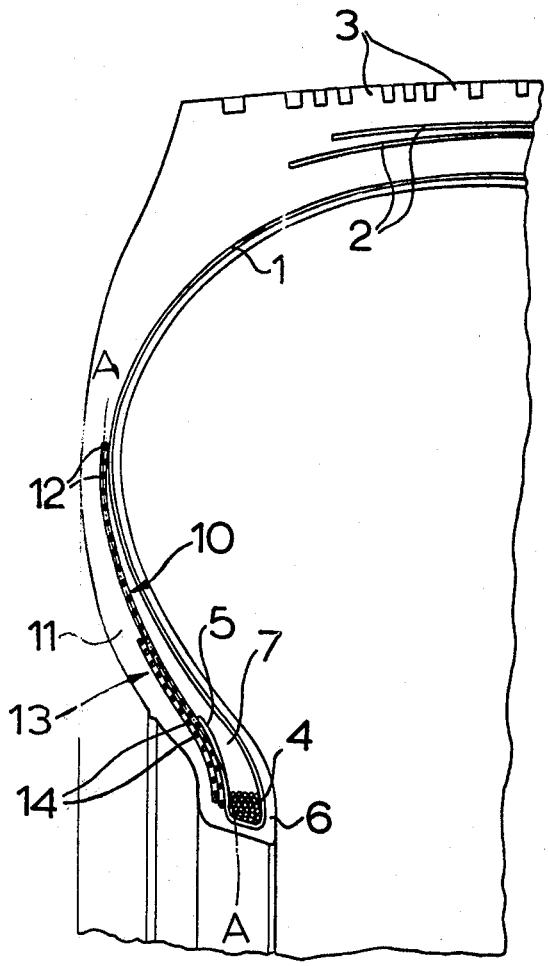

For a better understanding of the present invention, a particular embodiment of same will be described with reference to the attached drawings, in which:

FIG. 1 diagrammatically represents a section of the tire according to the invention, taken along a plane passing through the axis of rotation;

FIG. 2 is a lateral diagrammatic view of the structure of the tire of FIG. 1, and FIG. 3 represents a section of a part of the tire of FIG. 1, in enlarged scale.

The invention described in the earlier referred to patent application concerns a tire for vehicle wheels, having a structure analogou to that of the tire shown in FIG. 1. The tire substantially comprises a carcass 1, about which is applied a breaker 2, and a tread 3, and which is constituted by a cord ply, for instance made of nylon cords lying in substantially radial planes; the cords of said ply are diagrammatically represented also in FIG. 2.

The cords are turned up about a core 4 (FIG. 1) from the inside towards the outside, and the turned up portions 5 extend in the bead zone, as in the common structures of known radial tires.

A filling 7, made of a rubber compound, normally used in tires of this kind and having substantially a triangular form in cross section, is arranged in a radially outer position with respect to the bead core 4, so as to be situated at the flange 8 of a rim 9.

According to the structure described in Ser. No. 364,335, a strip 10 is situated in an axially outer position with respect tc the turned up portion 5. Strip 10 is made of a fabric of metal cords 12, and extends radially from the zone of the core 4 as far as the lower zone of the sidewall 11 at a height ranging between 25% and 45% of the section height H of the tire.

The metal cords 12 of the fabric strip 10 are parallel to one another and are inclined at an angle $\alpha$ (FIG. 2) ranging between 5° and 15° with respect to the circumference XX, which is concentric to the tire axis and which externally delimits strip 10.

Conveniently, the metal cords 12 have a 3×4/0.22 formation, namely are constituted by three strands, each of which is formed by four wires, each having a diameter of 0.22 mm. The metal cords 12 are preferably of the high elongation type (H.E.), said definition indicating cords whose ultimate elongation is about three times the ultimate elongation of the usual metal cords used in tires.

According to the invention of the previous application, at the lower zone of the sidewall 11, namely in the radially outer zone with respect to the flange 8, the strip of metal fabric 10 lies substantially on the flexional neutral axis of the sidewall itself (indicated by A—A in FIG. 3), while at the bead 6, namely in the radially inner zone with respect to said flange 8, said strip 10 deviates axially outwardly from said neutral axis A—A, as it is clearly visible in FIG. 3.

According to the improvement of the present invention, a second strip 13 of cords 14 is situated externally to each strip 10, the radially inner portion of said strip 13 being substantially located between the core 4 and the flange 8.

The material forming the cords 14 must be a material having good resistance to both tension and compression; it is preferably a metallic material.

When the cords 14 are made of metal, each of them can have a convenient 3×4/0.22 type formation, i.e., formed by three strands each comprising 4 wires, each having a diameter of 0.22 mm.

The metal cords 14 are parallel to one another, and are inclined at an angle $\alpha'$ (FIG. 2) between 45° and 90° with respect to the circumference X'X', which is concentric to the tire axis and which externally delimits strip 13. The orientation of the cords 14 is opposite that of the cords 12, so as to cause a crossing cord structure, as is clearly visible in FIG. 2.

The preferred value of $\alpha'$, by which the aims of the present invention, which will be explained infra, are better obtained, is 90° or a value slightly smaller than this. In this case it is evident that the cords 12 have a substantially radial path and are parallel to the cords 1 of the carcass.

The height h', measured in radial sense (FIG. 1), of the strip 13, is smaller than the height h of the strip 10 and is chosen according to a criterion which will be discussed infra.

In view of the above, the strip 13 is therefore positioned laterally outwardly with respect to the strip 10 and consequently, in a meridian section (FIG. 3), it is substantially situated at a certain distance from the neutral axis A—A of each sidewall 11.

The behavior during use of the above described tire takes place as follows:

First of all, as described in the above mentioned application, the strip of metal cords 10 is advantageous, since it confers a high circumferential rigidity to the radial tire, without negatively affecting its radial rigidity, and therefore its comfort. This favorable result is probably achieved by the combined action of a plurality of factors; in fact, the particular inclination of the metal cords of the reinforcing strip 10 inserted in the lower zone of the sidewalls, and the high elastic modulus of the metal cords with respect to the carcass cords reduces the deformations in the circumferential direction of the tire (and in particular the circumferential displacements of the radial cords in the carcass) caused by the tangential stresses exerted in the running direction between the ground and the tread.

Moreover, the fact of positioning the strip 10 substantially at the neutral axis A—A of the lower zone of each sidewall 11, accounts for the fact that said strip is not subjected to tension and compression stresses during the radial bending of the sidewalls, so that the stiffening action of the strip is minimized in the radial direction of the tire, with the consequent result of leaving the tire comfort practically unaffected.

The presence of the strip 13, according to the present invention, is moreover able to increase the torsional rigidity of the tire with respect to the structure described in the previous case. Substantially, by virtue of the strip 13, it is possible to obtain—as will be more fully explained below—a high resistance to bending of the lower zone of each sidewall 11 of the tire, without worsening the travelling comfort obtainable with said tire; consequently, the advantage is reached of reducing deformability and of increasing the mechanical resistance of the tire, particularly under the action of the stresses applied to the tread and directed perpendicularly to the mid-circumferential plane of the tire, which takes place when a vehicle travels along a curve at high speed.

The strip 13 is therefore able to virtually reduce the height of the normally bent tire zone (height H in FIG. 1) without reducing the air volume inside the tire itself and therefore maintaining a high travelling comfort in spite of this reduced height.

To better understand this advantageous result obtainable with the tire according to the present invention, it is advisable to consider the working of the described structure when the tire is fitted for instance on a vehicle travelling along a curved trajectory.

As known, in said conditions, the rolling plane transmits to the tread, in addition to the radial loads, stresses substantially perpendicular to the mid-circumferential plane of the tire, which tend to deform the sidewalls 11 of the tire itself by bending.

By initially examining the deformation of the tire sidewall inward of the curve, the deformed line of a portion of said sidewall found between two meridian planes can be considered as that obtained by applying on the section of FIG. 3 a force parallel to the axis of rotation and directed outward of the tire. It is evident that said deformation of the sidewall is first of all contrasted by the cords 12 of the strip 10, since each of said cords is subjected to axial tension during said deformation.

To note the stress, it is sufficient to consider the elongation to which each of said cords is subjected in consequence of said deformation of the sidewall. Moreover, the deformation of the sidewall is also contrasted by the cords 14 of the strip 13 which work under compression.

To notice this, it is to be taken into account that each cord of the strip 13 is situated at a certain distance from the neutral axis A—A of the sidewall, and each cord, particularly for high values of $\alpha'$, is oriented in a substantially radial direction and is therefore able to efficiently work under compression. Substantially, it can be assumed that, in the above indicated hypothetical condition of an inward deformation of the sidewall, each cord of the zone of said sidewall concerned with the deformation works as a true support, discharging the axial load applied to it in the bead zone adjacent the core.

At last, it is also to be taken into account that the deformation of the sidewall 11 is still contrasted by the bending resistance of each cord 14, which, since it is not rigidly locked in the relative strip, is able to work efficiently under bending.

Examining now the deformation of the other sidewall of the tire (the one outward of the curve), whose deformed line is obviously obtainable by applying on the sidewall 11 of FIG. 3 an axial force directed towards the tire inside, it is evident that the deformation is contrasted both by the resistance to axial tension of the cords 12 of the strip 10, and by the tension resistance of the cords 14 of the strip 13 which work now under tension as true tie rods in the outer sidewall. Moreover, as in the case of the other sidewall, the deformation is also hindered by the bending resistance of the cords 14 which work under bending independently of one another during the deformation.

From the above, it is evident that the working of the cords 14 of the zones of the deformed sidewalls is different according to whether the inner or the outer sidewall is considered; moreover, since said compression stress on each cord 14 of the strip 13 of the sidewall inward of the curve can be balanced by the reaction generated by the part of rim 9 on which the bead 6 leans, it is evident that, of the two tire sidewalls, the one which contrasts more efficiently the deformation by bending is that situated inward of the curve.

The height h' of the strip 13 is chosen to obtain a preestablished virtual increase of the bending rigidity of the sidewall 11; it must be smaller than the height h of the strip 10. The condition h'<h ensures a gradual bending deformability of the sidewall from the zone of the core 4 to the upper end of the strip 10.

Conveniently, the height h' can be so chosen as to obtain, in a tire characterized by a ratio H/C (H being the height of the tire measured in the meridian plane and C the maximum section width of the tire (FIG. 1)), a virtual reduction of height H capable of forming a new ratio H/C corresponding to the immediately preceding one in the range of standardized ratios. In fact, as known, there are tires having standardized ratios H/C, equal to 0.5, 0.6, 0.7 and 0.8 and respectively known as tires of series 50-60-70 and 80. Therefore a tire of series 70 (H/C=0.7) can be provided with a strip 13 whose height h' is such as to virtually reduce the value of H so as to obtain a ratio H/C=0.6.

It is understood that the described embodiment of the present invention can be modified or varied as necessary, without falling out of the scope of the invention itself.

What is claimed is:

1. In a pneumatic radial type tire for vehicle wheels having tire beads containing bead cores and comprising
    only one carcass ply, said carcass ply extending from one bead to the other bead and turning up about the said cores contained in the beads from the inner side to the outer side, each bead comprising a filling of hard rubber positioned on the core,
    the bead zone and the lower zone of the sidewall comprising a first strip of metal cords arranged in an axially outer position with respect to the carcass and to the turn-ups of the latter and extending radially from the core zone to a height of between 25% to 45% of the section height of said tire, said strip lying substantially on the trace of the flexional neutral axis in the lower zone of the sidewall, said metal cords being inclined at an average angle of from 5° to 15° with respect to the circumferential line of said tire,
    a second strip of cords of a tension and compression resistant metal, situated in an axially outer position with respect to said first strip radially extending from the core zone, the height of said second strip being smaller than the radial height of said first strip, the cords of said second strip being inclined at an angle of substantially 90° with respect to the circumferential lines of said tire.

2. The pneumatic tire of claim 1 wherein said cords of said second strip are metal cords.

3. The pneumatic tire of claim 1 wherein said second strip is situated at a pre-established radial distance with respect to said trace of the flexional neutral axis to allow the cords of said strip to work substantially under compression or tension during deformation of each tire sidewall.

4. The pneumatic tire of claim 2 wherein each of said metal cords of said second strip comprises three strands, each constituted by four wires, each having a diameter of 0.22 mm.

* * * * *